Dec. 9, 1969 V. L. WALKER 3,482,381
SICKLE BAR MOWER SUPPORT
Filed Nov. 14, 1966
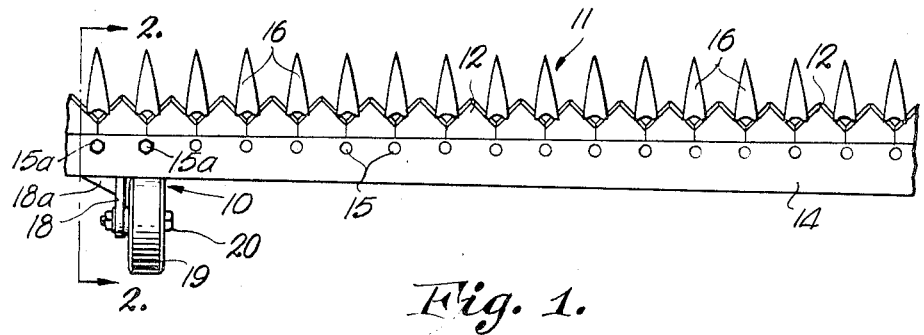
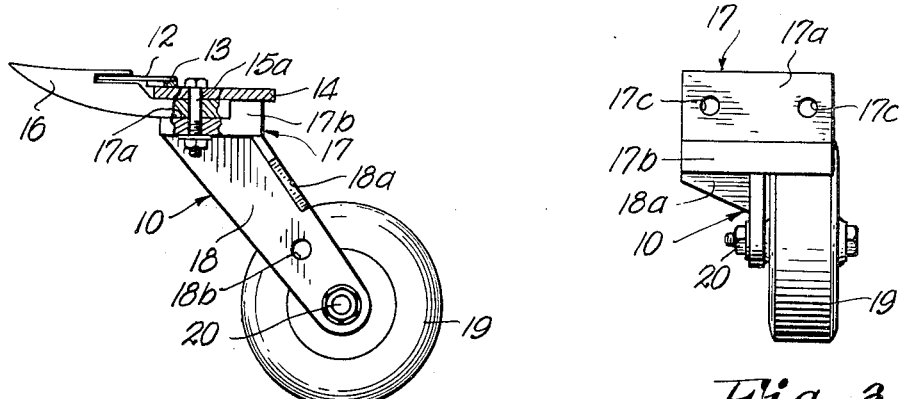
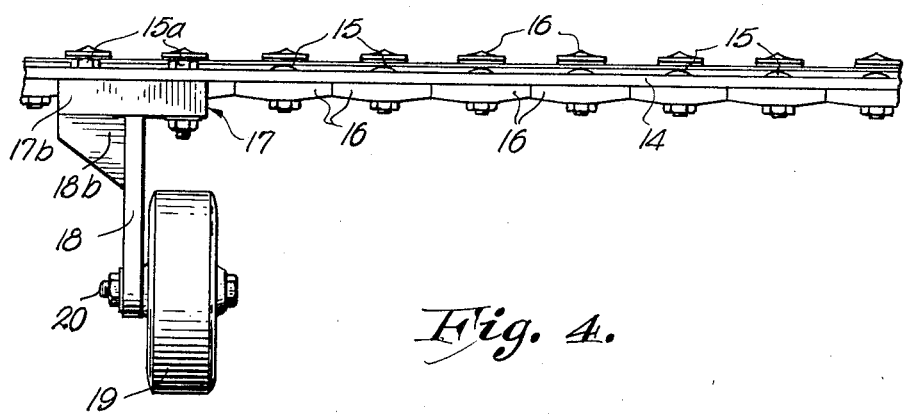
INVENTOR
Vernon L. Walker
BY
ATTORNEYS

United States Patent Office 3,482,381
Patented Dec. 9, 1969

3,482,381
SICKLE BAR MOWER SUPPORT
Vernon L. Walker, Harrisonville, Mo. 64701
Filed Nov. 14, 1966, Ser. No. 594,164
Int. Cl. A01d 73/00
U.S. Cl. 56—322    2 Claims

ABSTRACT OF THE DISCLOSURE

A support for field mower extended sickle bars has a face plate contoured to mate with the under surface of the sickle bar. The face plate has two parallel surfaces with the lower surface of same being apertured to align with pre-existing bolt holes in the sickle bar and to be boltedly attached thereto. The vertical shoulder interconnecting the two parallel surfaces prevents skewing and rigidifies the connection between the face plate and the sickle bar.

---

The invention relates to field mowers and refers more particularly to supports for extended sickle bars which comprise the cutting portion of the mower.

The advantages of supporting an extended sickle bar during a mowing operation are well known. For example, the cutting height of the sickle bar may be uniformly regulated throughout the length thereof and as a result, the cutting may be limited to the taller weeds without damage to grass or crops below that level. In addition, obstacles immediately above the ground are more easily avoided, the cut foliage will have less of a tendency to clog the cutters themselves, and the entire mowing operation may be carried out more quickly and efficiently without significant sickle bar bounce or end extremity vibrations.

An object of the present invention is to provide a uniquely constructed attachment and/or support for sickle bar field mowers. The uniqueness of the support is, in part, characterized by its easy attachability to and cooperation with the existing sickle bar structure.

Another object of the invention is to provide a rugged, light weight and inexpensive sickle bar support of the character described that may be affixed to the sickle bar by utilizing the preexisting bolt holes therein. As a result, the support stresses and utilizes the structural characteristics of the sickle bar and thusly permits an economy of parts, metal castings and labor costs in the manufacture of same.

A further object of the invention is to provide a sickle bar bounce eliminating support that forms an extremely rugged and solid connection with the sickle bar itself, yet remains simple and easy to remove or to be spacedly shifted along the length of said bar. Accordingly, the contour and shape of the upper face of the support contributes to the rigidity and non-skewableness of the above-mentioned connection.

Another object of the invention is to provide a sickle support whose overall shape and construction aids both in the elimination of grass and weed clogging as well as decreasing the shock effect on the sickle bar itself when mowing in and around rough and irregular terrain.

Other and further objects of the invention, together with the features of novelty appurtenant thereto, will appear in the course of the following description.

In the accompanying drawings, which form a part of the specification and are to be read in conjunction therewith, and in which like reference numerals indicate like parts in the various views:

FIG. 1 is a top elevational view of a portion of a conventional sickle bar showing the subject bar support attached to the left end portion of the sickle bar;

FIG. 2 is an enlarged sectional view taken along the line 2—2 of FIG. 1 in the direction of the arrows and showing the left side of the sickle bar support with a portion of the upper connecting face of the support broken away to show the connecting bolt between the sickle bar and the bar support;

FIG. 3 is a top view of the support of FIG. 2, said support being detached from the sickle bar so as to show the upper surface of the connection plate of same; and FIG. 4 is a rear view of the attached sickle bar support as shown in FIGS. 1 and 2.

Turning now more particularly to the drawing, reference numeral 10 is used to generally indicate the subject field mower support. Support 10 is designed to be utilized with and attached to an extended sickle bar 11. The sickle bar is of conventional construction and includes movable cutter sections 12. A longitudinally extending flat reciprocable rod 13 is operatively associated in a conventional manner with cutter sections 12 to impart the appropriate motion thereto. This rod (13) rests upon the upper surface of the main mower bar 14 as seen in FIG. 2. Sickle guards 16 extend forwardly of the cutting edges of sections 12 and are connected to extend from main bar 14 by bolts 15. A significant and important feature of the construction of the conventional sickle bar unit is that bolts 15 play an integral part in the construction of same. These bolts necessarily have preexisting bolt holes at regularly spaced intervals along the entire length of the extended sickle bar, thereby facilitating utilization of the subject support as will be discussed, infra.

Turning now to the construction of the support itself, FIGS. 2 and 3 include side and top views, respectively, of the sickle bar contacting face plate 17 of support 10. The contour and shape of the upper surface of face plate 17 is designed to mate with the under surface of the extended sickle bar. For example, face plate 17 includes a rectangular surface 17a and a rectangular raised dog 17b of less width than surface 17a running along the inner or rearward peripheral edge portion of plate 17. Two bolt holes 17c extend through larger rectangular surface 17a and are selectively spaced to be aligned with the preexisting bolt holes in the extended sickle bar.

A single leg 18 depends from plate 17 at a substantial angle so that the lower portion of the leg extends rearwardly of face plate 17 when viewed from above as in FIG. 3. The leg 18 is substantially centered along the lower surface of face plate 17 as such may be cast as a unit or separately formed and welded thereto in a conventional manner.

A single brace 18a lends support to the under side of face plate 17a and more evenly distributes the dynamic loading of the face plate along the longitudinal axis of leg 18 even though same connects at an angle with the face plate. Note that brace 18a abuts substantially one-half of the rearward portion of face plate 17 and leg 18 with definite taper inwardly towards the center of the leg.

The lower end portion of leg 18 has two apertures 18b for the purpose of providing for selective vertical height positioning of a wheel 19.

Wheel 19 may take on various forms, however, I have found that a solid or semi-pneumatic rubber tire construction with appropriate hub bearings may be easily attached to the alternate apertures 18d by a simple bolt and lock nut arrangement represented by the numeral 20.

The above-mentioned shape and construction of leg 18 relative to face plate 17 plays an integral role in the elimination of mower clogging. By angling leg 18 rearwardly, wheel 19 is in a ground contacting position behind the central vertical plane of the sickle bar. As a result, the cut particles have a tendency to slide off leg 18 due to the angulation thereof. Additionally, the shock effect on the sickle bar, resulting from the striking of ditches and rough terrain, is not as severe since the angulation of leg 18 is away from the forward movement of the mower.

In utilizing the subject sickle bar support, the optimum positioning of attachment 10 may be selected according to field terrain and the length and flexibility of the sickle bar. It is then only necessary to remove the bolts 15 that are already present along the length of the extended sickle bar and position the face plate 17 of support 10 properly so that bolt holes 17c align with the now vacated bolt holes in the sickle bar. When this is done, the contour of the upper face of support 10, e.g. face plate 17, mates with the shape of the under side of the sickle bar in such a manner that the lower portion of the sickle guard 16 abuts the upper surface 17a and contacts the forward vertical surface of dog 17b. The upper surface of dog 17b contacts main support bar 14 of the sickle bar thusly forming a non-skewable fit. Bolts 15a are substituted for the removed sickle bar bolts 15, as it is usually necessary that one-half inch additional bolt length is required for connecting purposes. Conventional lock nuts 15c then securely connect the support 10 and the sickle bar. In many instances at least two such supports of readily utilized on a single sickle bar.

If for some reason, it becomes necessary to change the lateral position of support 10, conventional tools may be conveniently used to remove bolts 15 and reconnecting the attachment via bolts 15b at the desired location. In a like manner, the vertical alignment and selective height of the support relative to the ground may be had by changing the utilized aperture 18d.

From the foregoing, it will be seen that this invention is one well adapted to attain all of the ends and objects hereinabove set forth together with other advantages which are obvious and which are inherent to the structure.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A support for a field mower having an extended sickle bar with sickle guards thereon, said support comprising:
    a face plate, said face plate having at least two non-overlapping parallel surfaces, said surfaces contacting only the underside of said sickle bar, one of said surfaces being defined as a raised dog portion, said raised dog portion extending along one edge of said face plate whereby said face plate is provided with a contour corresponding to the contour of the underside of the combination sickle bar and guards, said face plate mating with said underside of the combination of the sickle bar and guards by means of said corresponding contours to prevent skewing of said support relative to said sickle bar, said other surface being apertured at selected intervals to align with pre-existing bolt holes in said sickle bar and said guard,
    a leg depending from said face plate, and
    a wheel adjustably connected adjacent to the lower portion of said leg to contact the ground.

2. The invention as in claim 1 wherein said face plate has at least two of said apertures therein, said apertures and said bolt holes being aligned and receiving a connecting bolt in each communicatingly aligned aperture and hole for the purpose of securely connecting said support with said sickle bar.

References Cited

UNITED STATES PATENTS

| | | | |
|---|---|---|---|
| 638,715 | 12/1899 | Hopkins | 56—322 |
| 2,246,943 | 6/1941 | Jones | 56—298 |
| 2,812,630 | 11/1957 | Elfes | 56—322 |
| 3,217,478 | 11/1965 | Geere | 56—322 |

F. BARRY SHAY, Primary Examiner

P. A. RAZZANO, Assistant Examiner